United States Patent
Lee et al.

(10) Patent No.: US 6,279,999 B1
(45) Date of Patent: Aug. 28, 2001

(54) HEAT SHRINKABLE FABRIC PANELS FOR FACILITATING SEAT COVER INSTALLATION

(75) Inventors: Robert Lee, Wilmington; Kent Stephenson, Greenville, both of NC (US)

(73) Assignee: Collins & Aikman Products Co., Charlotte, NC (US)

( * ) Notice: Subject to any disclaimer, the term of this patent is extended or adjusted under 35 U.S.C. 154(b) by 0 days.

(21) Appl. No.: 09/457,748

(22) Filed: Dec. 8, 1999

(51) Int. Cl.[7] .................................................. A47C 7/02
(52) U.S. Cl. ................. 297/452.62; 297/229; 297/218.1
(58) Field of Search .................. 297/452.62, 452.59, 297/452.61; 29/91.1, 91.5; 26/18.5; 66/147

(56) References Cited

U.S. PATENT DOCUMENTS

| | | | |
|---|---|---|---|
| 3,146,143 | 8/1964 | Bolesky et al. | 156/212 |
| 3,643,308 | 2/1972 | Yamamoto | 29/91.1 |
| 3,695,692 | * 10/1972 | Williams | 297/229 |
| 4,699,427 | * 10/1987 | Kobayashi | 297/452.62 |
| 4,761,035 | 8/1988 | Urai | 297/452 |
| 4,860,415 | 8/1989 | Witzke | 29/91.1 |
| 5,235,826 | * 8/1993 | Brooks et al. | 297/452.58 X |
| 5,308,141 | * 5/1994 | Robinson et al. | 297/218.1 |

FOREIGN PATENT DOCUMENTS 6-15070 (A)   1/1994   (JP).

* cited by examiner

Primary Examiner—Laurie K. Cranmer
(74) Attorney, Agent, or Firm—Myers Bigel Sibley & Sajovec

(57) ABSTRACT

Methods and apparatus for form-fitting covers to vehicle passenger seats are provided. A cushion is mounted on a seat frame and surrounded by a cover having one or more heat shrinkable fabric panels attached to a peripheral edge thereof. Each heat shrinkable fabric panel is attached to the seat frame and heat is applied. The heat causes each panel to shrink along a predetermined direction, thereby drawing the cover taut around the cushion and frame.

13 Claims, 3 Drawing Sheets

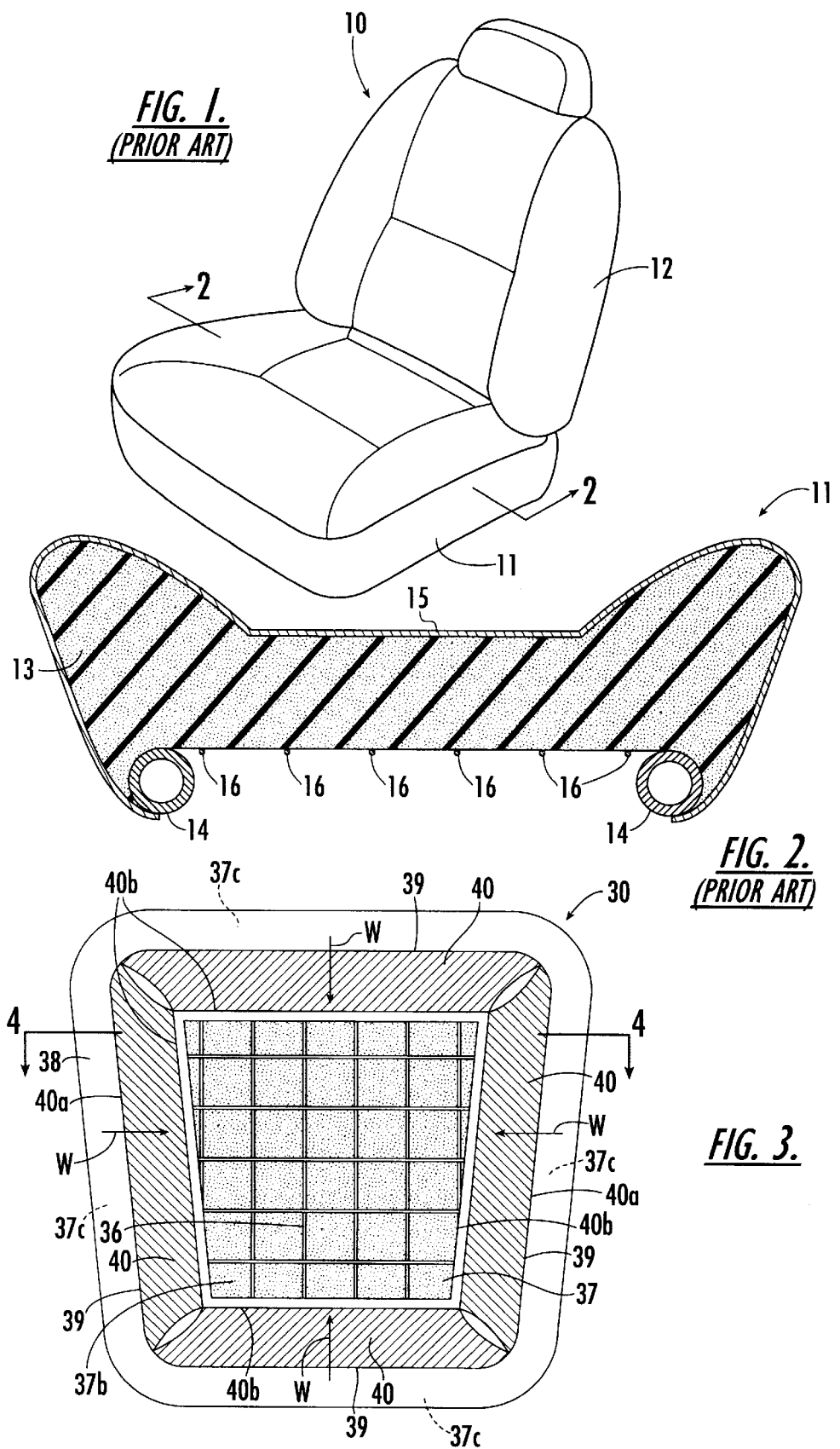

HEAT SHRINKABLE FABRIC PANELS FOR FACILITATING SEAT COVER INSTALLATION

FIELD OF THE INVENTION

The present invention relates generally to passenger vehicle seats and, more particularly, to seat covers for passenger vehicle seats.

BACKGROUND OF THE INVENTION

During the production of automotive interiors, particularly seats, fabric that is to serve as a seat cover is typically stretched over a cushion and frame and secured thereto (i.e., the fabric is "form-fitted" to the seat cushion and frame). Conventional processes for form-fitting fabric covers to seat cushions and frames may involve manually pulling and stretching a cover to eliminate wrinkles while, at the same time, attaching the cover to the frame. Unfortunately, manual form-fitting processes may be somewhat labor intensive and, thus, costly. Because vehicle manufacturers are continuously looking for ways to reduce vehicle manufacturing and assembly costs, it would be desirable to provide lower cost methods of form fitting covers to passenger seats.

SUMMARY OF THE INVENTION

In view of the above discussion, the present invention provides methods and apparatus for form-fitting covers to passenger seats. A cushion is mounted on a seat frame and surrounded by a cover having one or more heat shrinkable fabric panels attached to a peripheral edge thereof. Each heat shrinkable fabric panel is attached to the seat frame and heat is applied. The heat causes each panel to shrink along a predetermined direction, thereby drawing the cover taut around the cushion and frame.

Each heat shrinkable fabric panel includes a plurality of partly-oriented yarn (POY) strands aligned in a first direction and a plurality of fully-oriented-yarn (FOY) strands aligned a second direction transverse to the first direction. The POY strands are configured to shrink between about ten percent and sixty percent (10%–60%) of an unheated length when heat is applied thereto. The FOY strands are configured to resist shrinking. Accordingly, each heat shrinkable fabric panel is configured to shrink along the direction of orientation of the POY strands.

An important advantage of the present invention is that the process of manually form-fitting covers to passenger seats may be eliminated. As such, fabrication and assembly costs may be reduced.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a perspective view of a conventional passenger seat for a vehicle.

FIG. 2 is a section view of the passenger seat of FIG. 1 taken along lines 2—2.

FIG. 3 is a bottom plan view of a passenger seat incorporating heat shrinkable fabric panels according to the present invention.

DETAILED DESCRIPTION OF THE INVENTION

Figure 4:
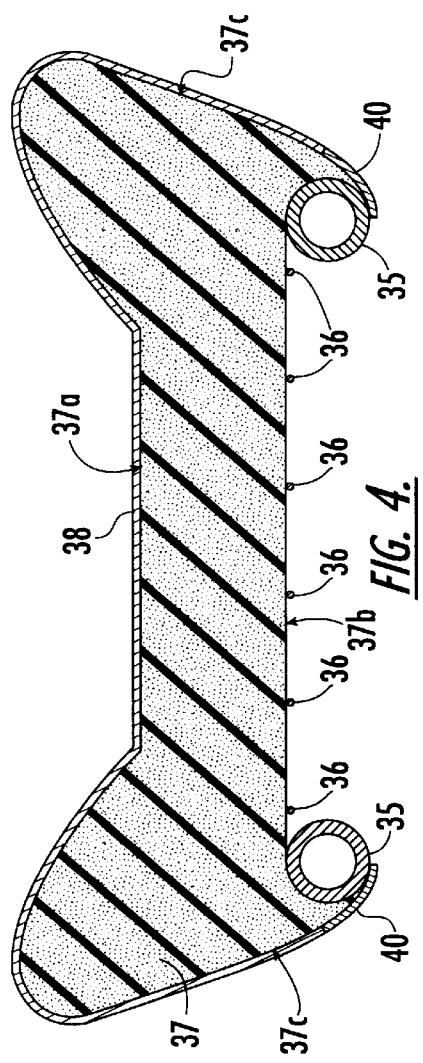
FIG. 4 is a section view of the passenger seat of FIG. 3 taken along lines 4—4.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the drawings.

Referring now to FIG. 1, a conventional passenger seat 10 for a vehicle is illustrated. The illustrated passenger seat 10 includes a seat portion 11 and a back rest portion 12. As illustrated in FIG. 2, the seat portion 11 includes a contoured cushion 13 attached to a frame 14 and surrounded by a cover 15. The contoured cushion 13 is supported by the frame 14 via a plurality of springs 16 extending within the frame 14, as is known to those of skill in the art. The cover 15 is fabric that has been pulled tight (i.e., "form-fitted") around the contoured cushion 13 and secured to the frame 14.

Referring now to FIGS. 3 and 4, a seat 30 incorporating elongated panels 40 formed from heat shrinkable fabric, according to the present invention, is illustrated. The illustrated seat 30 includes a frame 35, a plurality of springs 36 extending within the frame 35, a contoured, resilient cushion 37 mounted on the frame 35 and supported by the springs 36, and a cover 38 form-fitted to the contoured, resilient cushion 37. The contoured, resilient cushion 37 includes front, back, and side surfaces 37a, 37b, 37c, respectively. The cover 38 surrounds the front surface 37a and each side surface 37c of the contoured, resilient cushion 37 and includes a peripheral edge portion 39. In the illustrated embodiment, four elongated panels 40 formed from heat shrinkable fabric are utilized to attach the cover 38 to the frame 35.

In the illustrated embodiment, each elongated panel 40 includes opposite first and second edge portions 40a, 40b. A widthwise direction (indicated as W) for each elongated panel 40 is defined by a line extending from a respective first edge portion 40a to a respective second edge portion 40b for each panel 40. The first edge portion 40a of each elongated panel 40 is attached to the peripheral edge portion 39 of the cover 38. The second edge portion 40b of each elongated panel 40 is attached to the frame 35.

Each elongated panel 40 may be attached to the cover peripheral edge portion 39 in various ways including, but not limited to, stitching and adhesives. Each elongated panel 40 may be attached to the frame 35 in various ways including, but not limited to the use of fasteners and adhesives.

Each elongated panel 40 is woven from yarn configured to shrink along the respective widthwise direction W when heat is applied thereto. Thus, in the presence of heat, each elongated panel 40 shrinks along its widthwise direction W to draw the peripheral edge portion 39 of the cover 38 towards the frame 35, thus pulling the cover 38 taut around the contoured, resilient cushion 37.

Figure 5:
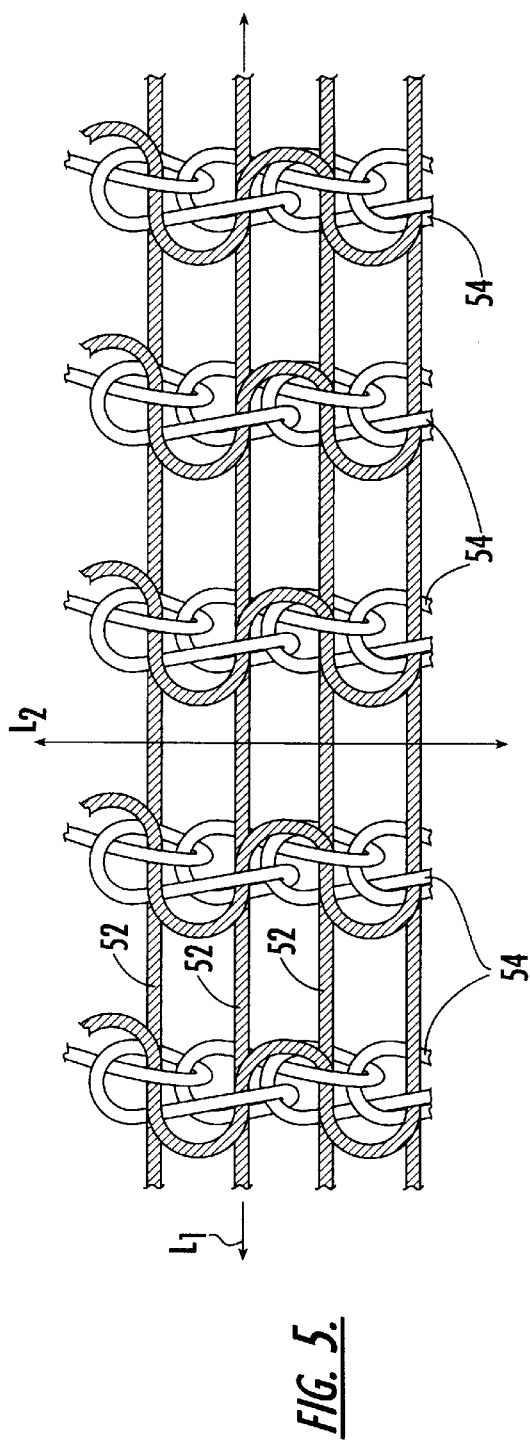
FIG. 5 is an enlarged plan view of a weave pattern of a heat shrinkable panel according to an embodiment of the present invention illustrating orientation of partly-oriented-yarn (POY) strands and fully-oriented-yarn (FOY) strands.

Referring now to FIG. 5, an enlarged plan view of a weave pattern 50 of heat shrinkable fabric according to a preferred embodiment of the present invention is illustrated. The illustrated weave pattern 50 includes partly-oriented yarn (POY) strands 52 extending along a first direction $L_1$ (i.e., the longitudinal direction of each POY strand), and fully-oriented-yarn (FOY) strands 54 extending along a second direction $L_2$ transverse to the first direction $L_1$. When heated, the POY strands 52 shrink along their longitudinal direction (i.e., along direction $L_1$). Preferably, each POY strand 52 is configured to shrink along the first direction $L_1$ between about ten percent and sixty percent (10%–60%) of an unheated length when heat is applied thereto. Preferably, each FOY strand 54 is configured to resist shrinkage along direction $L_2$ when heat is applied thereto, or shrink by no more than about three to six percent (3%–6%).

Each POY strand 52 preferably is formed from yarn filaments in which the draw ratio is less than normal resulting in only partial longitudinal orientation of the polymer molecules. Each FOY strand 54 preferably is formed from yarn filaments in which the polymer molecules have full longitudinal orientation. POY strands and FOY strands and there formation are understood by those of skill in the art and need not be discussed further herein.

Exemplary fibers out of which POY strands 52 and FOY strands 54 may be formed include polyvinyl chloride, polyethylene, polystyrene, and polyester. However, it is understood that, for practicing the present invention, there may be used any kind of fabric, provided that is knit from fibers which are thermally shrinkable in a lengthwise direction of the fibers without losing their original, fundamental properties.

Figure 6:
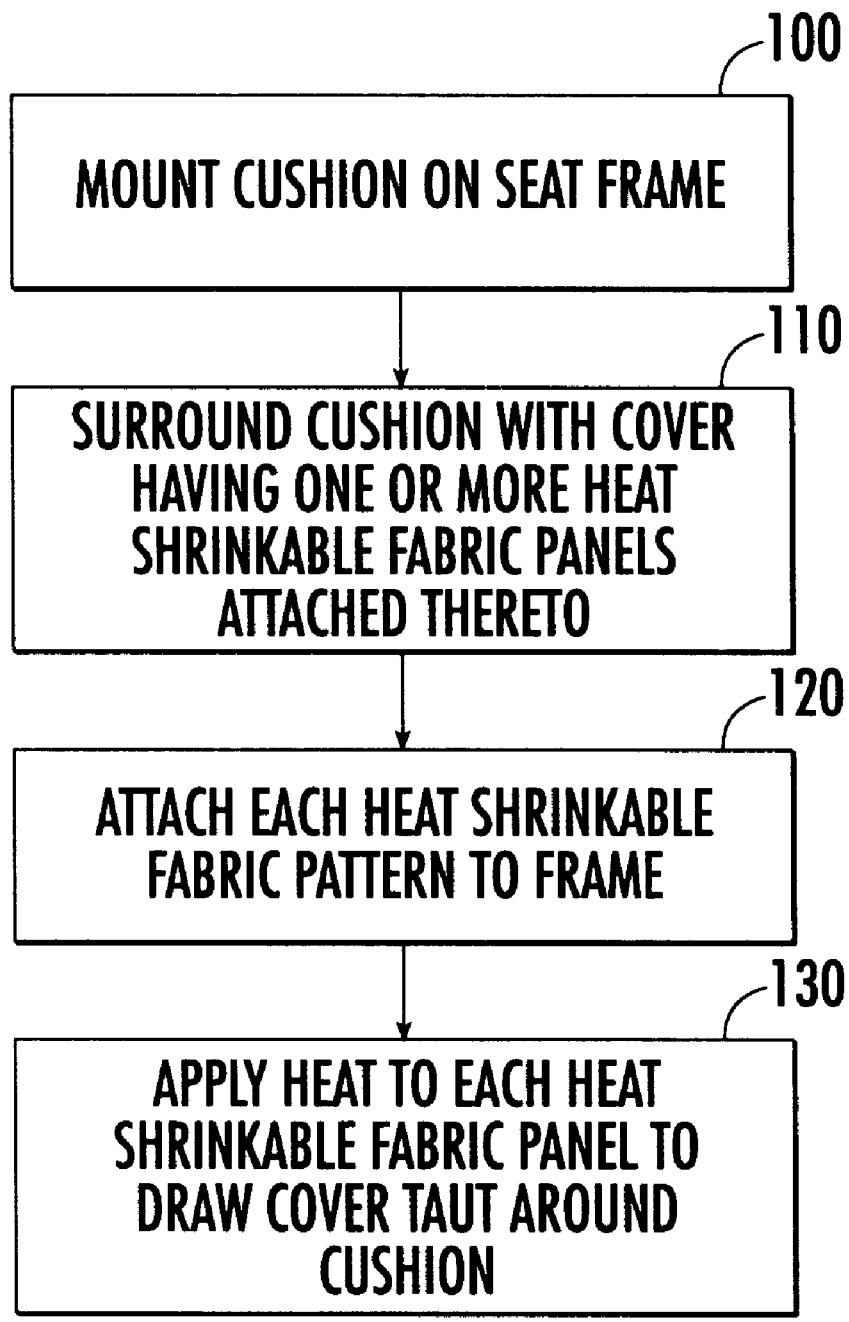
FIG. 6 illustrates operations for form-fitting covers around passenger vehicle seats utilizing heat shrinkable fabric panels, according to an embodiment of the present invention.

Referring now to FIG. 6, operations for form-fitting covers around passenger vehicle seats, according to the present invention, are illustrated. A cushion is mounted on a seat frame (Block 100) and surrounded by a cover having one or more heat shrinkable fabric panels attached to a peripheral edge of the cover (Block 110). As described above, each heat shrinkable fabric panel includes a plurality of partly-oriented yarn (POY) strands in a first direction and a plurality of fully-oriented-yarn (FOY) strands in a second direction transverse to the first direction. The POY strands are configured to shrink between about ten percent and sixty percent (10%–60%) of an unheated length when heat is applied thereto. Each heat shrinkable fabric panel is then attached to the frame (Block 120). Heat is then applied to each heat shrinkable fabric panel causing each panel to shrink along a predetermined direction, thereby drawing the cover taut around the cushion and frame (Block 130).

Heat may be applied via conventional methods including, but not limited to, infrared lamps, hot air, steam, and the like. In addition, a seat assembly (i.e., the cushion, frame and cover) may be passed through a heat generating source to apply heat to each of the heat shrinkable fabric panels.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A seat comprising:
   a frame;
   a resilient cushion mounted on the frame, wherein the resilient cushion comprises front, side and back surfaces; and
   a cover surrounding the front, side, and back surfaces of the resilient cushion, wherein the cover comprises:
      a first fabric portion having a peripheral edge portion that extends around the front, side, and back surfaces of the cushion; and
      a second fabric portion attached to substantially the entire peripheral edge portion of the first fabric portion and directly to the frame, wherein the second fabric portion comprises a plurality of panels having heat shrinkable fibers woven substantially throughout an entire length of each panel, and wherein the second fabric portion is configured to shrink and draw the cover taut around the resilient cushion and frame when heat is applied to the second fabric portion.

2. A seat according to claim 1 wherein the second fabric portion comprises a plurality of partly-oriented-yarn (POY) strands woven therein along a predetermined direction.

3. A seat according to claim 2 wherein the POY strands are configured to shrink between about ten percent and sixty percent (10%–60%) of an unheated length when heat is applied thereto.

4. A seat according to claim 2 wherein each POY strand comprises fibers selected from the group consisting of polyvinyl chloride, polyethylene, polystyrene, and polyester.

5. A seat according to claim 1 wherein the second fabric portion comprises a plurality of partly-oriented yarn (POY) strands in a first direction and a plurality of fully-oriented-yarn (FOY) strands in a second direction transverse to the first direction, and wherein the POY strands are configured to shrink between about ten percent and sixty percent (10%–60%) of an unheated length when heat is applied thereto.

6. A passenger seat for a vehicle, comprising:
   a frame;
   a resilient cushion mounted on the frame, wherein the resilient cushion comprises front, side and back surfaces; and
   a cover surrounding the front, side, and back surfaces of the resilient cushion, wherein the cover comprises:
      a first fabric portion having a peripheral edge portion that extends around the front, side, and back surfaces of the cushion; and
      a second fabric portion comprising opposite first and second edge portions and defining a widthwise direction between the first and second edge portions, wherein the first edge portion is attached to substantially the entire peripheral edge portion of the first fabric portion and the second edge portion is attached to the frame, and wherein the second fabric portion comprises heat shrinkable fabric woven substantially throughout the entire second fabric portion from yarn strands that are configured to shrink along the widthwise direction of the heat shrinkable fabric to draw the cover taut around the resilient cushion and frame when heat is applied to the second fabric portion.

7. A passenger seat according to claim 6 wherein the heat shrinkable fabric comprises partly-oriented-yarn (POY)

strands that are configured to shrink between about ten percent and sixty percent (10%–60%) of an unheated length when heat is applied thereto.

8. A passenger seat according to claim 7 wherein each POY strand comprises fibers selected from the group consisting of polyvinyl chloride, polyethylene, polystyrene, and polyester.

9. A passenger seat according to claim 6 wherein the heat shrinkable fabric comprises a plurality of partly-oriented yarn (POY) strands in the widthwise direction and a plurality of fully-oriented-yarn (FOY) strands in a direction transverse to the widthwise direction, and wherein the POY strands are configured to shrink between about ten percent and sixty percent (10%–60%) of an unheated length when heat is applied thereto.

10. A passenger seat according to claim 6 wherein the frame comprises at least one spring disposed therewithin for supporting the cushion.

11. A method of covering a seat comprising the steps of:
   mounting a cushion on a frame, wherein the cushion has front, side, and back surfaces;
   surrounding the cushion with a cover, wherein the cover comprises a first fabric portion having a peripheral edge portion that extends around the front, side, and back surfaces of the cushion, and a second fabric portion attached to substantially the entire peripheral edge portion of the first fabric portion, wherein the second fabric portion comprises heat shrinkable fabric woven substantially throughout the second fabric portion from yarn strands that are configured to shrink along a designated direction;
   attaching the second fabric portion directly to the frame; and
   applying heat to the second fabric portion to shrink the second fabric portion along the designated direction and draw the cover taut around the cushion and frame.

12. The method according to claim 4, wherein the second fabric portion comprises a plurality of partly-oriented yarn (POY) strands in a first direction and a plurality of fully-oriented-yarn (FOY) strands in a second direction transverse to the first direction, and wherein the POY strands are configured to shrink between about ten percent and sixty percent (10%–60%) of an unheated length when heat is applied thereto.

13. The method according to claim 11 wherein the step of applying heat to the second fabric portion comprises passing the cushion, frame and cover through a heat generating source.

* * * * *

UNITED STATES PATENT AND TRADEMARK OFFICE
CERTIFICATE OF CORRECTION

PATENT NO.    : 6,279,999 B1
DATED         : August 28, 2001
INVENTOR(S)   : Lee et al.

It is certified that error appears in the above-identified patent and that said Letters Patent is hereby corrected as shown below:

Column 6,
Line 12, please change "claim 4" to -- claim 11 --.

Signed and Sealed this

Twenty-ninth Day of June, 2004

JON W. DUDAS
*Acting Director of the United States Patent and Trademark Office*